US012713196B2

(12) United States Patent
Castro et al.

(10) Patent No.: US 12,713,196 B2
(45) Date of Patent: Aug. 18, 2026

(54) APPARATUS AND METHOD FOR RENDERING AUDIO FOCUS OF A LIVE EVENT

(71) Applicant: EDGE Sound Research Inc., Riverside, CA (US)

(72) Inventors: Ethan E. Castro, Chino Hills, CA (US); Winson R. Bi, Redlands, CA (US); Christiaan A. Clark, Anaheim, CA (US)

(73) Assignee: EDGE Sound Research Inc., Riverside, CA (US)

( * ) Notice: Subject to any disclaimer, the term of this patent is extended or adjusted under 35 U.S.C. 154(b) by 120 days.

(21) Appl. No.: 18/821,954

(22) Filed: Aug. 30, 2024

(65) Prior Publication Data

US 2025/0080936 A1 Mar. 6, 2025

Related U.S. Application Data

(60) Provisional application No. 63/633,206, filed on Apr. 12, 2024, provisional application No. 63/579,925, filed on Aug. 31, 2023.

(51) Int. Cl.
*H04S 7/00* (2006.01)
*G06T 7/246* (2017.01)
*H04R 3/00* (2006.01)
*H04R 5/027* (2006.01)

(52) U.S. Cl.
CPC ................ *H04S 7/30* (2013.01); *G06T 7/246* (2017.01); *H04R 3/005* (2013.01); *H04R 5/027* (2013.01); *G06T 2207/10016* (2013.01); *H04S 2400/11* (2013.01); *H04S 2400/15* (2013.01)

(58) Field of Classification Search
CPC ........... H04R 3/005; H04R 5/027; H04S 7/30; H04S 2400/11; H04S 2400/15
See application file for complete search history.

(56) References Cited

U.S. PATENT DOCUMENTS 9,185,361 B2 * 11/2015 Curry ............... H04N 21/21805
9,979,499 B2 5/2018 Oldfield et al.
10,136,216 B2 * 11/2018 Cengarle ................ H04R 3/005
11,016,188 B2 * 5/2021 Johnson ................ G01S 7/2955
11,206,453 B2 * 12/2021 Ramos ............... H04N 21/2668
11,303,997 B2 * 4/2022 Krüger ................... H04R 1/406
11,683,646 B2 * 6/2023 Hawke ..................... H04R 3/12 381/82

(Continued)

FOREIGN PATENT DOCUMENTS

EP 3262640 B1 8/2020

*Primary Examiner* — Paul W Huber
(74) *Attorney, Agent, or Firm* — Cooley LLP

(57) ABSTRACT

A system has an object tracking system to track an object of interest at a live event with a time series sequence of x, y, and z spatial coordinates. An audio capture system has audio capture elements, where each audio capture element has audio capture element configurable parameters. The audio capture system collects audio signals at the live event. An audio ray casting system dynamically produces audio output parameters for the audio capture elements based upon the time series sequence of x, y, and z spatial coordinates and configurable ray casting parameters. A signal mixer processes the audio signals and the audio output parameters to render audio focus on the object of interest at the live event.

12 Claims, 4 Drawing Sheets

(56) References Cited

U.S. PATENT DOCUMENTS

| | | | | |
|---|---|---|---|---|
| 11,689,691 | B2 | 6/2023 | Lawo | |
| 2022/0383894 | A1 | 12/2022 | Schroeder et al. | |
| 2024/0048934 | A1 * | 2/2024 | Correia | H04R 1/1041 |

* cited by examiner

APPARATUS AND METHOD FOR RENDERING AUDIO FOCUS OF A LIVE EVENT

CROSS-REFERENCE TO RELATED APPLICATION

This application claims priority to U.S. Provisional Patent Application 63/579,925, filed Aug. 31, 2023 and U.S. Provisional Patent Application 63/633,206, filed Apr. 12, 2024, the contents of which are incorporated herein by reference.

FIELD OF THE INVENTION

This invention relates generally to sound systems. More particularly, this invention relates to computerized techniques for rendering audio focus of a live event.

BACKGROUND OF THE INVENTION

Traditionally, a human audio engineer is required to mix microphones to capture specific activity at a live event. This includes managing multiple performers during a live concert or capturing impactful moments during a sporting event such as the swish of a basketball, contact with a ball, and player contact. Humans are adept at multi-sensory integration, using multiple senses to perform tasks that can be complex for traditional computing devices. For example, a human audio engineer uses sight to help determine whether to increase gain on certain microphones when performers approach certain microphones.

However, humans are fallible and may sometimes miss the desired activity, causing other broadcast or audio-critical applications to fail downstream from capture. Therefore, it would be desirable to have an automated flexible approach to sound capture at a live event.

SUMMARY OF THE INVENTION

A system has an object tracking system to track an object of interest at a live event with a time series sequence of x, y, and z spatial coordinates. An audio capture system has audio capture elements, where each audio capture element has audio capture element configurable parameters. The audio capture system collects audio signals at the live event. An audio ray casting system dynamically produces audio output parameters for the audio capture elements based upon the time series sequence of x, y, and z spatial coordinates and configurable ray casting parameters. A signal mixer processes the audio signals and the audio output parameters to render audio focus on the object of interest at the live event.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
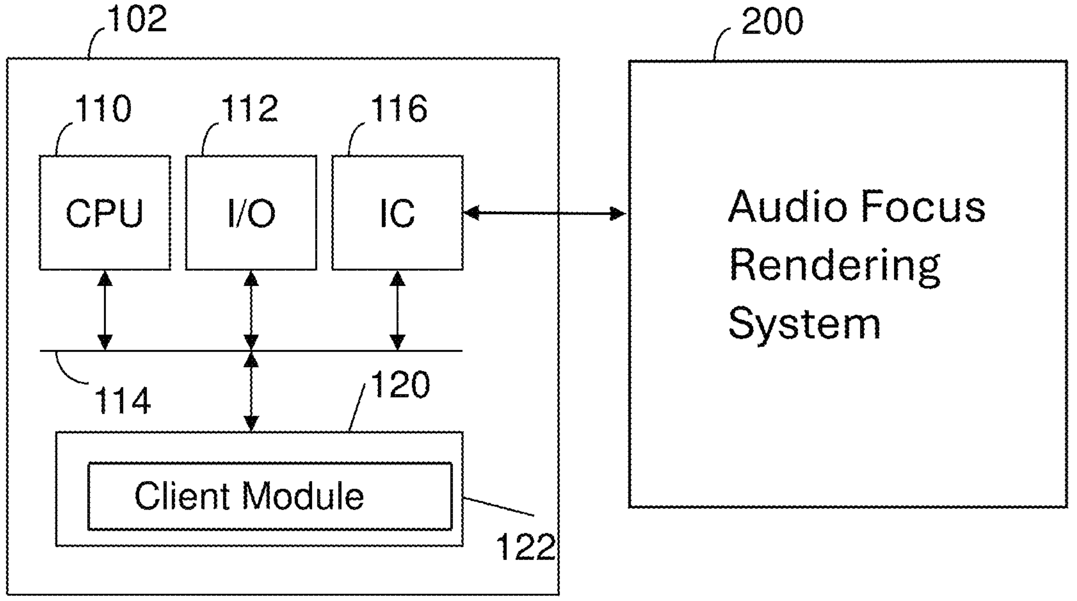
FIG. 1 illustrates a system configured in accordance with an embodiment of the invention.

FIG. 1 illustrates a client device 102 connected to an audio focus rendering system 200. The client device 102 includes a processor 110 connected to input/output devices 112 via a bus 114. The input/output devices may include a keyboard, mouse, touch display and the like. An interface circuit 116 is also connected to the bus 114. The interface circuit 116 establishes a connection with the audio focus rendering system 200. The interface circuit 116 may utilize a cable connection, a wired network connection or a wireless network connection. A memory 120 is also connected to the bus 114. The memory 120 stores a client module 122 with instructions executed by processor 110. Client device 102 may be a computer, Smartphone, wearable device and the like. Client device 102 may operate with the audio focus rendering system 200 in a variety of ways, such as to configure components of the system 200, to playback content generated by the system 200, and the like.

Figure 2:
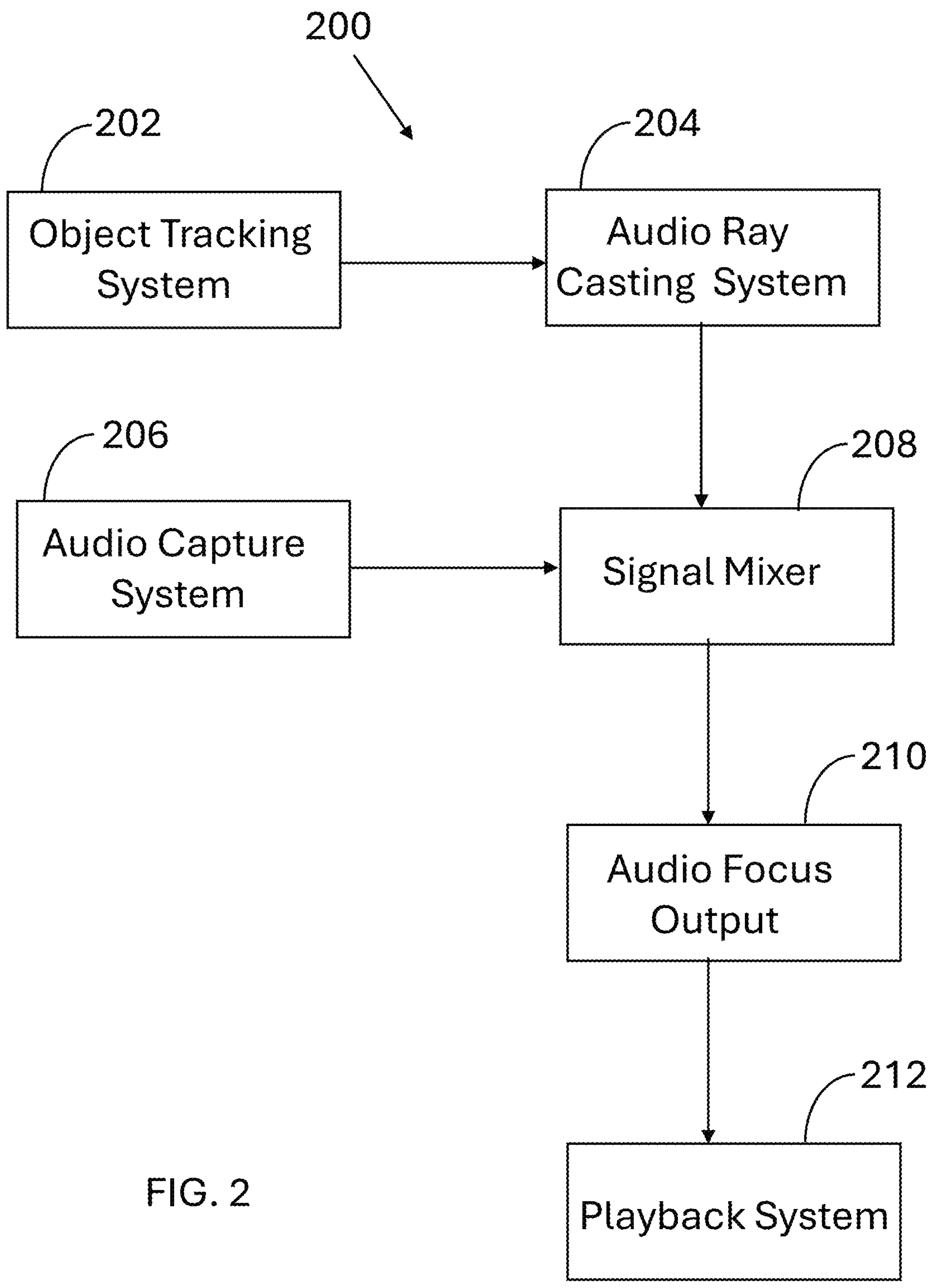
FIG. 2 illustrates an audio focus rendering system configured in accordance with an embodiment of the invention.

FIG. 2 illustrates components of the audio focus rendering system 200. Various components of the system 200 have components of the type discussed in connection with the client device 102, including a processor, memory, interface circuit and the like. Various components of FIG. 2 may be combined with one another or be integrated into the client device 102.

The system 200 include an object tracking system 202. The object tracking system 202 may be a computer vision object tracking system, a radar object tracking system, a Light Detection and Ranging (LiDAR) object tracking system or an infrared object tracking system. Regardless of the implementation, the system tracks an object of interest at a live event with a time series sequence of x, y, and z spatial coordinates.

The system 200 also includes an audio capture system 206. The audio capture system 206 has audio capture elements, such as microphones. Each audio capture element has audio capture element configurable parameters. The audio capture element configurable parameters include a desired audio pickup zone. The desired audio pickup zone may be defined by a pickup spread, capture distance, capture angle and audio capture element x, y, and z spatial coordinates. The audio capture system 206 collects audio signals at a live event.

The system 200 also includes an audio ray casting system 204. The audio ray casting system 204 dynamically produces audio output parameters (e.g., signals to control the volume for the audio capture elements based upon the time series sequence of x, y, and z spatial coordinates) and configurable ray casting parameters (e.g., x, y, and z coordinates of each audio capture element, directionality of audio capture elements and sensitivity values of the audio capture elements).

The point of interest is used by the audio ray casting system 204 to determine which audio capture element would "cast a ray" to the point of interest. These audio capture elements are selected and their outputs are activated to create the audio object at the point of interest while applying a gain value based on the point of interest's distance from the audio capture element.

Audio ray casting involves casting rays to intersect objects in the live event and determine the relative distance between the object of interest and the audio capture element. In one embodiment, a normalized makeup gain coefficient between 0 and 1 is used based on distance between the object of interest's centroid and the audio capture element location. The audio capture element's directionality is also considered to potentially blend input from two audio capture elements. If two audio capture elements overlap for a given object of interest, they are both active and the two makeup gain coefficients are combined to provide a bias ratio towards which audio capture element is closest, while still providing some signal from the other audio capture element.

A signal mixer 208 processes the audio signals and the audio output volume signals to render audio focus on the object of interest at the live event. This results in audio focus output 210, which may be sent to client device 102 or some other system of audio signal playback. The audio focus output 210 is recorded and is able to be played back with an playback system 212. The playback system 212 may be a separate system or may be incorporated into client machine 102. The playback system may render a new audio focus on another object of interest at the live event as specified by an operator or the end user.

Figure 3:
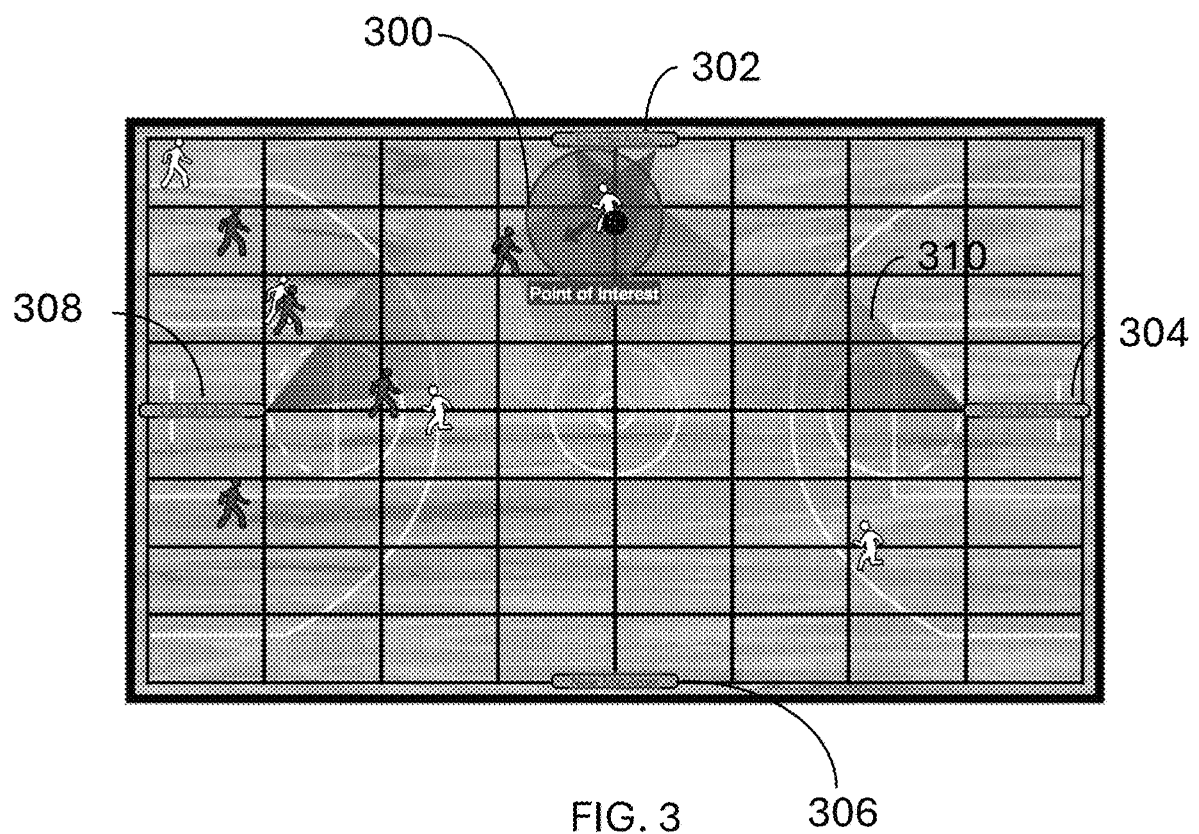
FIG. 3 illustrates a point of interest in a live event and a set of audio capture elements.

FIG. 3 illustrates a point of interest 300 at a live event, in this case a basketball game. This venue has a far microphone array 302, a right microphone array 304, a near microphone array 306 and a left microphone array 308. Each microphone array has a coverage area. For example, right microphone array 304 has coverage area 310.

In the default state of the basketball configuration, the system receives the location of the basketball with respect to the court and focuses the microphones on the court to coalesce on the point of interest 300. The point of interest is user configurable.

Using known positions, direction and sensitivities of the audio capture elements (ACE) (e.g., microphones), one can map the coverage patterns of each ACE, and calculate the correlated gain and pan coefficients of every position of the map, creating a coefficient map. A point of interest can be calculated by using the positional data of objects of interest from a non-audio mode, (e.g. computer vision data from live video footage). It should be noted a variety of methods can be used to calculate the point of interest depending on what is suitable for the application. These methods include radar object tracking, LiDAR object tracking, and infrared object tracking.

The point of interest is where sonic focus should be applied. The coefficient map is used to dynamically apply the correct gain to each ACE in real time to isolate audio capture to the point of interest. The system continues to dynamically adjust the correct gain mix of each ACE to follow the point of interest as it updates in real time.

Figure 4:
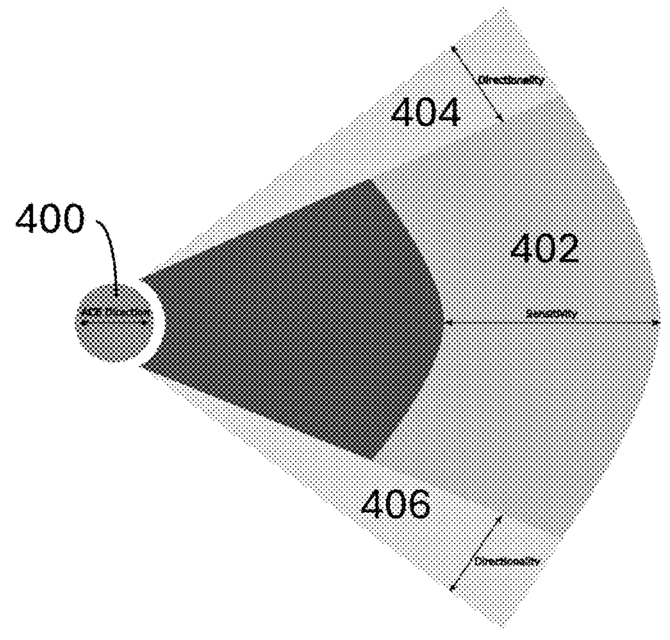
FIG. 4 illustrates coverage area based on sensitivity and directionality of an audio capture element.

To calculate the coefficient map, the sensitivity, directionality, and location of every ACE is used. FIG. 4 illustrates an ACE 400 with an associated sensitivity region 402 and directionality regions 404 and 406.

The sensitivity of an audio capture element is defined to be the measure of the audio capture element's ability to convert acoustic pressure into an electric voltage, this is often measured in millivolts output by the audio capture element in the presence of 1 Pascal of pressure. In one embodiment, to measure the sensitivity of the audio capture element, a 1 kHz sine wave at 94 dB SPL or 1 pascal (Pa) pressure is used. The pressure level chosen is the industry standard reference level for sensitivity tests for audio capture elements. The resulting magnitude of the analog or digital output signal from the audio capture element is the measure of the audio capture element's sensitivity.

Directionality is defined as the audio capture element's sensitivity to sound relative to the direction from which the sound arrives. While traditional audio capture elements, such as microphones, usually have predefined capture areas, recent advancements in array microphones with beam forming capabilities allow a capture area to be defined within certain bounds with respect to the desired target. Adjusting the capture area will affect the perceived directionality of the capture device. For both audio capture elements with adjustable and predefined capture areas, the audio capture element's orientation can be used to control the directionality as well.

Combining each audio capture element's sensitivity and directionality, one can calculate the coverage of each audio capture element. The location of an audio capture element is defined as the coordinate location with respect to the coefficient map correlated to the real space. In one embodiment, the audio focus algorithm uses the location of every audio capture element to determine their pan in the soundscape and to determine the total coverage of every audio capture element together. Ideally, the location, sensitivity and directionality of every audio capture element is chosen to obtain optimal audio capture coverage of the real space.

Optimal audio capture coverage is defined as covering the entirety of the area of interest evenly, with quite a bit of overlap between ACEs. This is often most easily achieved using ACEs that feature wide pickup patterns with even sensitivity.

Figure 5:
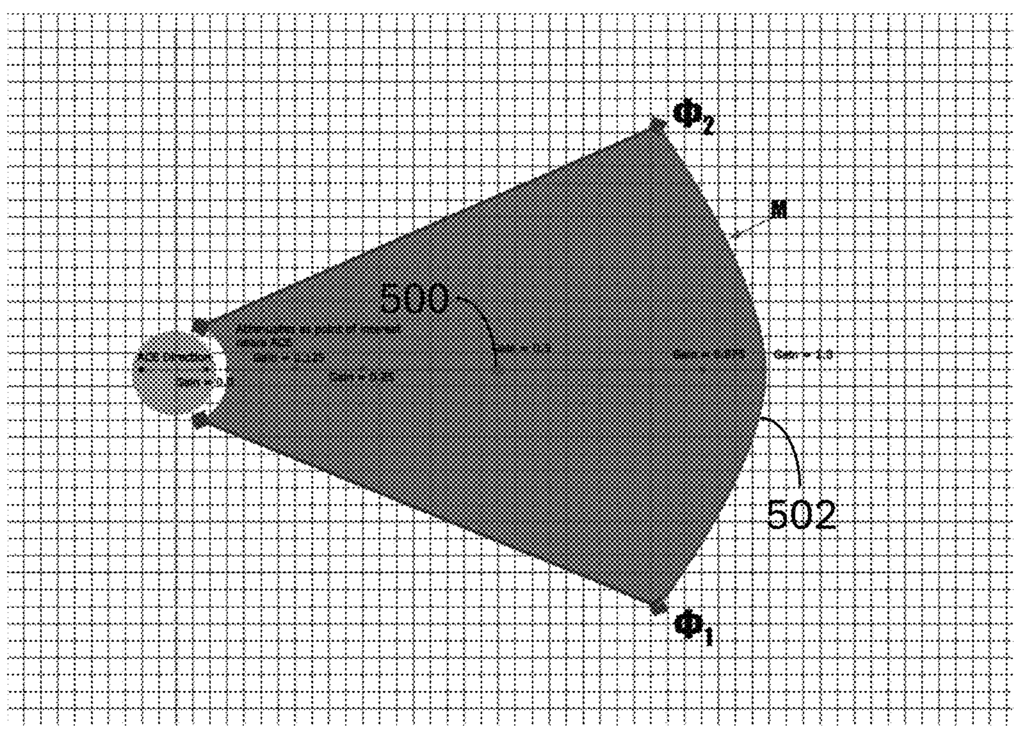
FIG. 5 illustrates gain value calculations for a single audio capture element.

A point of interest is calculated based on using a non-audio mode (i.e., the object tracking system 202) to determine the ideal ACEs to source audio based on their proximity to the objects of interest. In the case of a computer vision object tracking system, the tracking system coordinates the position of all objects of interest for every single frame in real time. The point of interest is defined as the position where ideal ACEs should be chosen for the particular frame. To determine the ideal ACEs for the particular frame, one can "cast rays" from each ACE to the point of interest to see if the point of interest falls in the ACE's capture zone and can therefore provide correct audio data. To calculate this, one can use the general form:

$$a_i = \text{atan2}(i_y - p_y, i_x - p_x) < \phi 1_i \ \&\& \ \text{atan2}(i_y - p_y, i_x - p_x) > \phi 2_i$$

where i is the index of each ACE, $a_i$ returns 0 or 1 to determine whether the ith-audio capture element is on or off, $p_x$ and $p_y$ are the x- and y-coordinates of the point of interest, $i_x$ and $i_y$ are the x- and y-coordinates of the audio capture element, and $\phi 1$ and $\phi 2$ are the angles determined by each ACEs polarity as shown in FIG. 5. For the a tan 2 calculation used in the equation, the ACE's location is used as the origin of a unit circle to determine whether the tangential angle created by the ACE to the point of interest lies inside the lobe.

Figure 6:
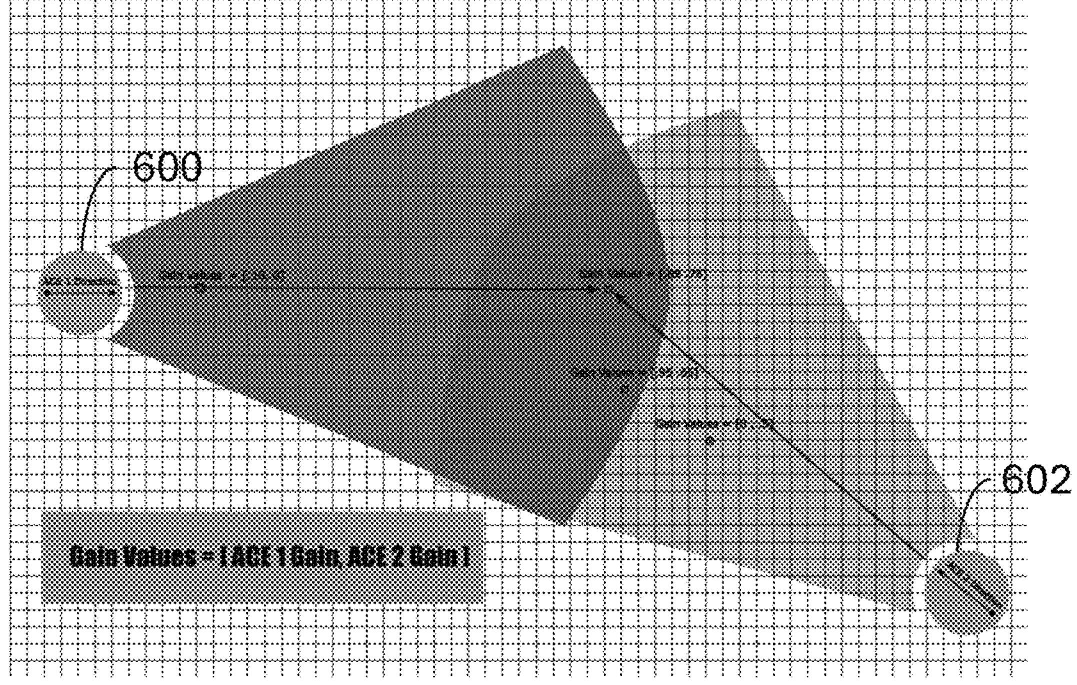
FIG. 6 illustrates gain value calculations for two audio capture elements.

The distance between the point of interest and each active ACE is then calculated to determine the makeup gain coefficient that should be applied to further away objects of interest. One can calculate this using the general form:

$$d_i = \sqrt{(i_x - p_x)^2 + (i_y - p_y)^2}$$

where i is the index of each ACE, $d_i$ returns a normalized value between 0 and 1 to add linear gain to the ith-audio capture element as shown in FIGS. 5 and 6, $p_x$ and $p_y$ are the x- and y-coordinates of the point of interest, and $i_x$ and $i_y$ are the x- and y-coordinates of the audio capture element. Once the distance is calculated, $a_i$ is reevaluated to see if it falls outside of the lobes sensitivity threshold, m.

$$a_i = \begin{cases} 1 & d_i \le m_i \\ 0 & d_i > m_i \end{cases}$$

To create the audio object, the active ACEs signals are summated along with the calculated makeup gain into a monophonic output o. This can be calculated using the general form:

$$o = \sum_{i=1}^{n} a_i * s_i * \left((1 + d)_i\right)$$

where n is the maximum number of active ACEs, i is the index of each ACE, $a_i$ returns 0 or 1 to determine whether the ith-audio capture element is on or off, $s_i$ is the current sample of the ith-audio capture element, and $d_i$ is the calculated makeup gain.

Given the sensitivity and directionality of an audio capture element, the coverage of the audio capture element can be determined. In combination with the location and orientation of every audio capture element, one can map every single audio capture element with their coverage along a coordinate grid, as shown in FIG. 5. To map a constant gain value for every audio capture element at every point in the grid, a transfer function is used to correlate the audio capture element's coverage to a gain value. In this example, the gain is normalized between 0 and 1 based on the distance from the audio capture element as shown in FIG. 5. In particular, FIG. 5 shows a gain of 0 at the center of the audio capture element 501 and shows a gain of 1 at the edge of the capture zone 502. These bounds can be adjusted manually to control how much overlap the bounds have, controlling the gain ramping between the coverage areas. Once the centroid and bounds for every audio capture element's coverage is determined, the gain value for each audio capture element is calculated for every point in the area of interest to create a coefficient map of the area of interest, as shown in FIG. 6, which shows gain values from two overlapping audio capture elements 600 and 602.

Using the location of each audio capture element in conjunction with the location of the point of interest, each audio capture element's signal can be panned to a predefined point of view. This is utilized by the real time signal mixer 208 to create an immersive stereo soundscape.

The signal mixer 208 creates a virtual mixer with n input channels and two output channels, where n is the number of audio capture elements, and the two output channels represent an output stereo pair. The panning and gain values for every channel is set using the location and a predefined point of view as described above to create an immersive stereo soundscape. Then, using a stream of coordinates of the point of interest p(x,y,z), the coefficient map is navigated where every x,y,z coordinate has a predefined gain value for each of the $\eta$ audio capture elements. As the point of interest updates and navigates the coefficient map, the panning and gain parameters update for each of the channels in the virtual mixer to the pre-calculated gain values for each of the audio capture elements.

The audio focus output signal may be relayed to the client device 102 or to a speaker system at the venue. Multiple objects of interest may be followed simultaneously to produce separate or combined audio focus output signals to be delivered as discrete sub mixes. The playback system 212 may alter the audio focus output signal with each repeated viewing of the event.

The audio focus rendering system 200 may supply interfaces to the client device 102. The interfaces may be displayed on an output device (e.g., screen) and receive input from an input device (e.g., mouse or keyboard). An interface is supplied for audio capture element setup. The setup interface allows a user to categorize characteristics of each audio capture element separately. Configurable parameters include desired pickup zone. In one embodiment, the desired pickup zone is defined by a pickup spread, capture distance, capture angle and x, y, and z position of the audio capture element. Another interface allows a user to specify one or more objects of interest. Another interface displays responsive audio signal metering so that a user can be sure that each of the input channels is continually providing audio data.

Another interface is used during a live object control stage. The live object control stage has controls that isolate specific objects of interest. An interface is used to specify additional Digital Signal Processing (DSP) parameters to an object's mix and renders objects into industry standard spatial audio files by embedding tracking information as object metadata.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include but are not limited to: magnetic media, optical media, magneto-optical media, and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using an object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A system, comprising:

an object tracking system to track an object of interest at a live event with a time series sequence of x, y, and z spatial coordinates, wherein the object tracking system calculates the time series sequence of x, y, and z spatial coordinates using non-audio data;

an audio capture system with audio capture elements, each audio capture element having audio capture element configurable parameters, the audio capture system collecting audio signals at the live event;

an audio ray casting system to dynamically produce audio output parameters for the audio capture elements based upon the time series sequence of x, y, and z spatial coordinates and configurable ray casting parameters, wherein the audio output parameters include a coefficient map that uses known positions, direction and sensitivities of the audio capture elements to calculate correlated gain and pan coefficients for positions on the coefficient map, where the object of interest is calculated by positional data of objects of interest from the object tracking system; and a signal mixer to process the audio signals and the audio output parameters to dynamically apply correct gain to audio capture elements in real time to render audio focus on the object of interest at the live event.

2. The system of claim 1 wherein the object tracking system is a computer vision object tracking system.

3. The system of claim 1 wherein the object tracking system is a radar object tracking system.

4. The system of claim 1 wherein the object tracking system is a LiDAR object tracking system.

5. The system of claim 1 wherein the object tracking system is an infrared object tracking system.

6. The system of claim 1 wherein each audio capture element is a microphone or wideband vibration sensor.

7. The system of claim 1 wherein the audio capture element configurable parameters include a desired audio pickup zone.

8. The system of claim 7 wherein the desired audio pickup zone is defined by a pickup spread, capture distance, capture angle and audio capture element x, y, and z spatial coordinates.

9. The system of claim 1 wherein the configurable ray casting parameters include x, y, and z coordinates of each audio capture element.

10. The system of claim 1 wherein the configurable ray casting parameters include directionality of audio capture elements.

11. The system of claim 1 wherein the configurable ray casting parameters include sensitivity values of the audio capture elements.

12. The system of claim 1 wherein the live event is recorded to produce an event sequence, wherein the system further comprises a playback system to render a new audio focus on another object of interest at the live event.

* * * * *